(12) United States Patent
Honma

(10) Patent No.: US 7,684,684 B2
(45) Date of Patent: Mar. 23, 2010

(54) IMAGE SENSING APPARATUS HAVING AUTOFOCUS FUNCTION, AND METHOD OF CONTROLLING SAME

(75) Inventor: Yoshihiro Honma, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 11/758,684

(22) Filed: Jun. 6, 2007

(65) Prior Publication Data

US 2007/0286586 A1 Dec. 13, 2007

(30) Foreign Application Priority Data

Jun. 7, 2006 (JP) ............................. 2006-159141

(51) Int. Cl.
*G03B 17/00* (2006.01)
*G03B 3/00* (2006.01)
*H04N 5/228* (2006.01)

(52) U.S. Cl. .................... 396/52; 396/55; 396/124; 348/208.4; 348/208.16

(58) Field of Classification Search ............. 396/52–55, 396/124; 348/208.1, 208.4, 208.12, 352, 348/208.16
See application file for complete search history.

(56) References Cited

U.S. PATENT DOCUMENTS

| 5,422,673 | A | 6/1995 | Kondo et al. |
| 6,556,246 | B1 * | 4/2003 | Suda ........................... 348/352 |
| 2006/0066744 | A1 | 3/2006 | Stavely et al. |

FOREIGN PATENT DOCUMENTS

| JP | 03-001668 | 1/1991 |
| JP | 03-166870 | 7/1991 |
| JP | 05-344403 A | 12/1993 |
| JP | 2000-152065 | 5/2000 |
| JP | 2002-311470 | 10/2002 |
| JP | 2006-099119 A | 4/2006 |

* cited by examiner

*Primary Examiner*—Melissa J Koval
*Assistant Examiner*—Minh Q Phan
(74) *Attorney, Agent, or Firm*—Cowan Liebowitz & Latman, P.C.

(57) ABSTRACT

An image sensing apparatus performs focus control based upon image data of a region corresponding to a focus control region, the image data being a part of one screen of image data. The apparatus includes a camera-shake detector for detecting camera shake, and a focus detection zone designating unit for changing the focus control region with respect to the screen.

8 Claims, 6 Drawing Sheets

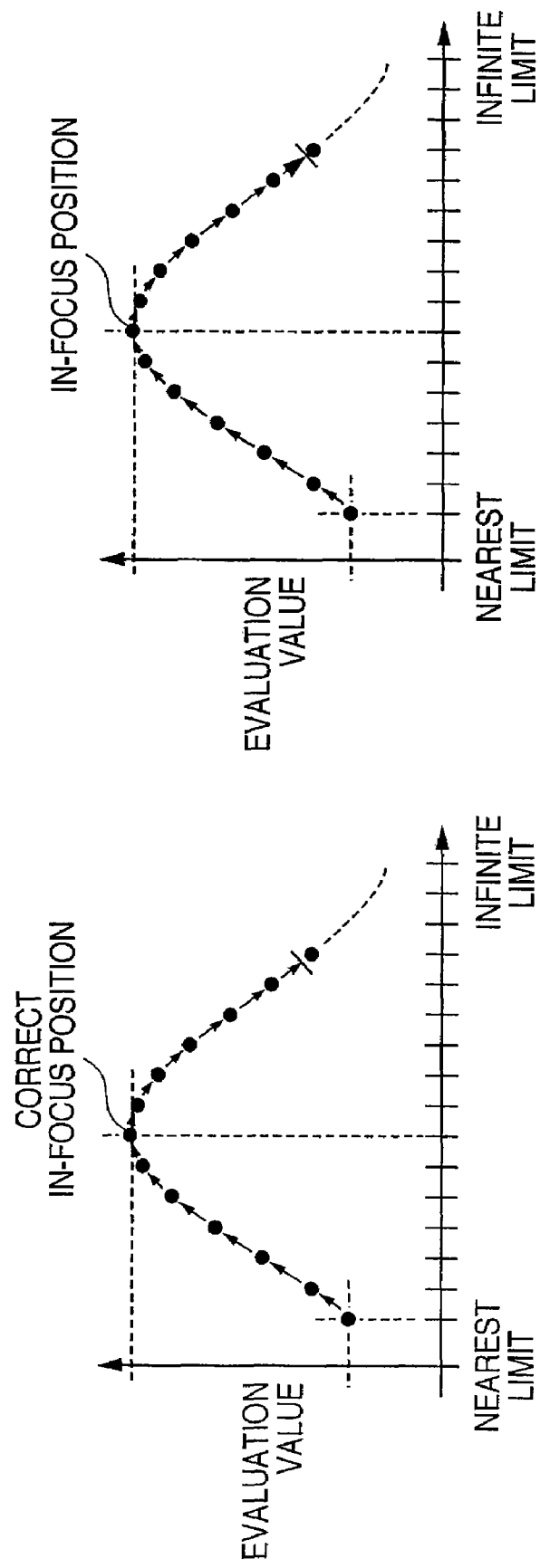

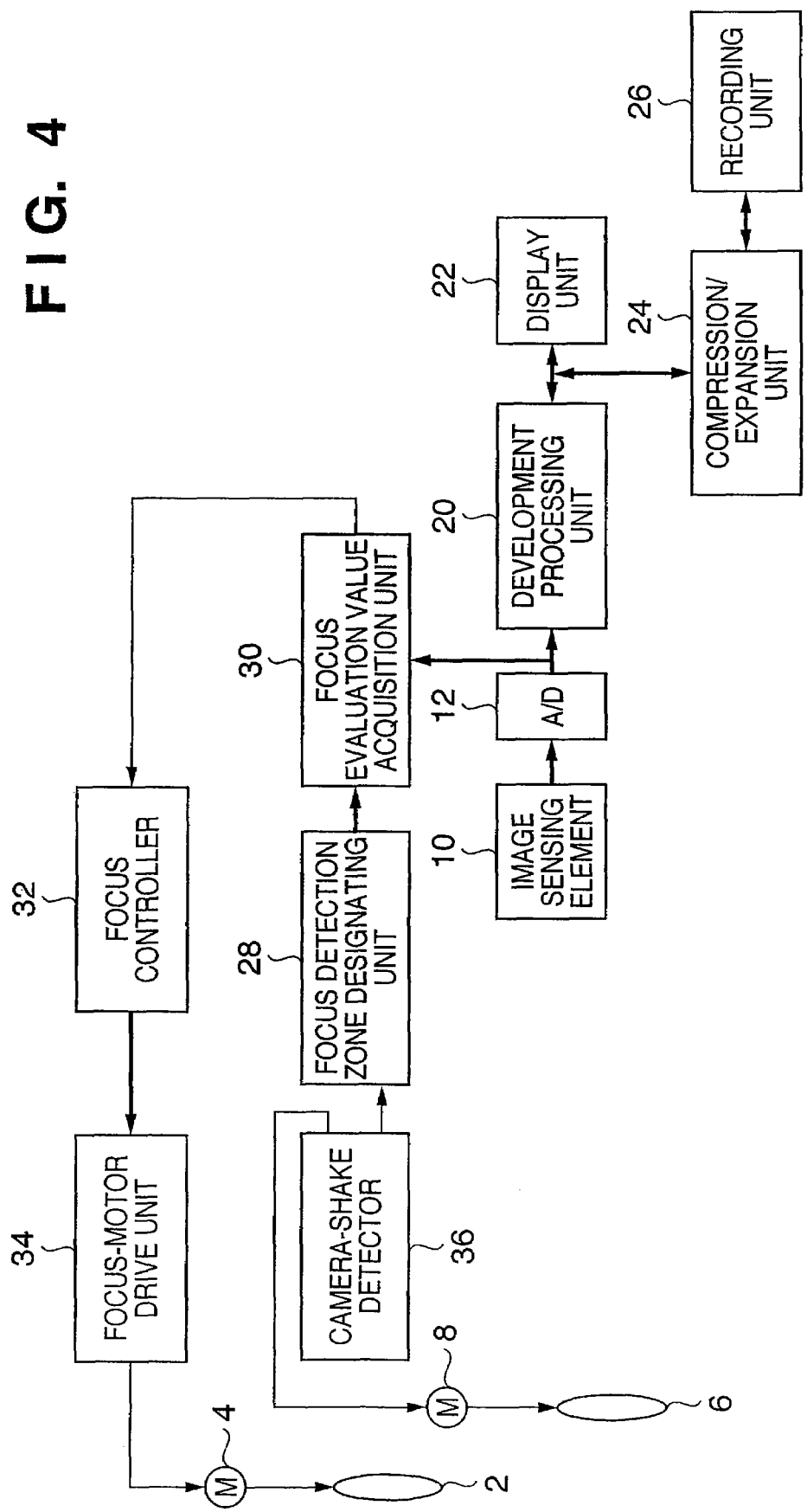

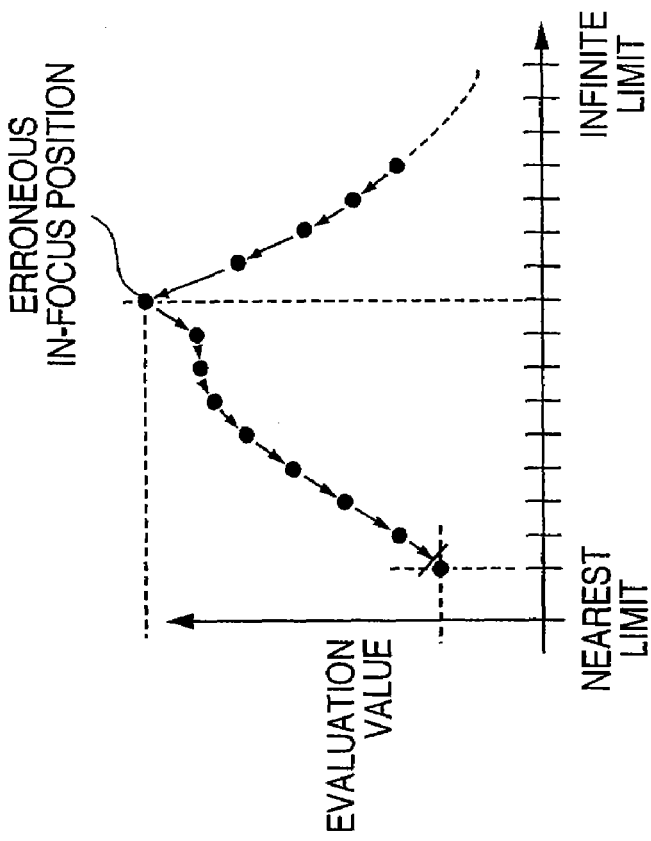
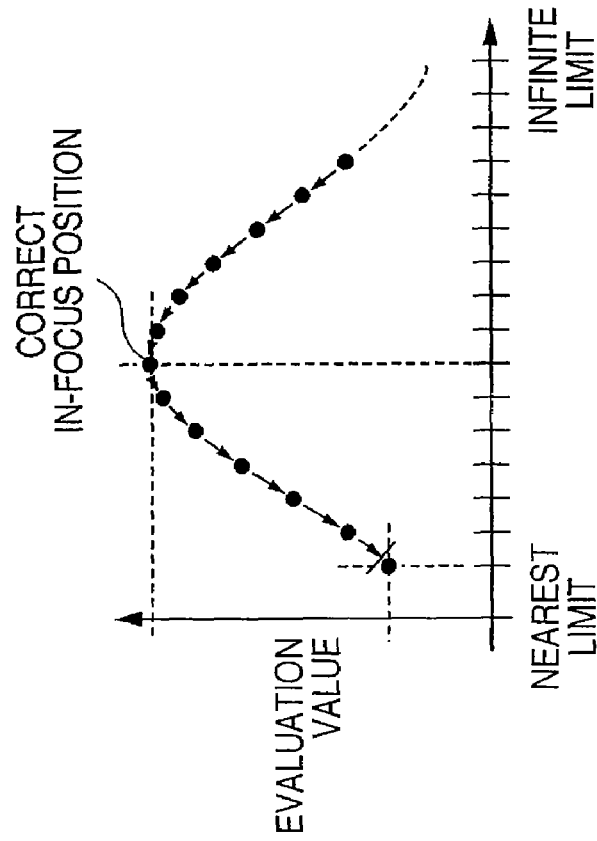
FIG. 6B
FIG. 6A

IMAGE SENSING APPARATUS HAVING AUTOFOCUS FUNCTION, AND METHOD OF CONTROLLING SAME

BACKGROUND OF THE INVENTION

1. Field of the Invention

The present invention relates to an image sensing apparatus and method of controlling this apparatus. More particularly, the invention relates to an image sensing apparatus having an autofocus function and a method of controlling this apparatus.

2. Description of the Related Art

In order to capture an image with optimum focus in an image sensing apparatus such as a digital camera or digital video camera, an autofocus scheme widely employed in the prior art involves using the central portion of a screen as a focus detection zone and focusing on a subject that is within this zone. A well-known method of performing such focusing involves detecting the in-focus state utilizing the nature that high-frequency components, which are contained in the image sensor output that corresponds to the focus detection zone, become largest at the in-focus position (e.g., see the specification of Japanese Patent Application Laid-Open No. 3-1668).

Further, the following method has been disclosed in the specification of Japanese Patent Application Laid-Open No. 2000-152065 in order to perform rapid focusing in a case where the above-mentioned method is applied to a still camera: First, an image is sensed at prescribed intervals while a focusing lens is moved from a position (referred to below as an "infinite-limit position"), at which infinite distance is brought into focus, to a position (referred to as a "nearest-limit position" below), at which point-blank distance is brought into focus. An evaluation value for determining focus is found based upon a plurality of images thus obtained by image sensing and information relating to these images, the focusing lens is moved to a position at which the evaluation value is maximized, and shooting and recording are performed.

However, a certain problem arises in the above-described autofocus method. Specifically, if the subject within the focus detection zone of one screen is displaced from the focus detection zone by camera shake while the plurality of images are being captured in order to obtain the evaluation value for autofocus, a correct evaluation value cannot be obtained and the subject will be out of focus.

This problem will be described with reference to FIGS. 5A and 5B.

FIG. 5A illustrates the positional relationship between a subject and background in the absence of camera shake. In the example depicted in FIG. 5A, the focus detection zone resides within a building surrounding a person. By contrast, in FIG. 5B, the focus detection zone has been shifted to the right relative to the subject by camera shake and the focus detection zone has emerged from within the building and now includes the outside wall on the right side.

FIGS. 6A and 6B are graphs illustrating the relationship between focusing-lens position and evaluation value when evaluation values are acquired regarding the subject shown in FIGS. 5A and 5B, respectively. FIG. 6A is a graph obtained in the absence of camera shake. In this case, the evaluation values peak when the subject is in focus. On the other hand, FIG. 6B is a graph in a case where camera shake has occurred at a focusing-lens position where the building in the background is brought into focus and the focus detection zone has shifted in the manner illustrated in FIG. 5B. In this case, the shifted focus detection zone includes the high-contrast outside wall portion of the building. As a consequence, the evaluation value peaks when the building has been brought into focus and the in-focus position is detected erroneously.

A conceivable method of solving this problem is to deal with camera shake by shifting the screen using a camera-shake correction function. However, the camera shake correction is processing whereby shaking of displayed video is corrected in such a manner that the image will not look strange as seen from the photographer or observer. Further, it is a technique that eliminates shaking of video in the entirety of the screen. Since this is not a technique that eliminates the shaking of the subject in the focus detection zone at the time of focusing, it leaves the above-described problem unsolved.

SUMMARY OF THE INVENTION

The present invention has been made in consideration of the above situation and has as its object to improve focus control accuracy in a case where camera shake has occurred.

According to the present invention, the foregoing object is attained by providing an image sensing apparatus for performing focus control based upon image data of a region corresponding to a focus control region, the image data being a part of one screen of image data, the apparatus comprising:

a camera-shake detector that detects camera shake; and a focus control region shifter that changes the focus control region with respect to the screen based upon result of detection performed by the camera-shake detector.

According to the present invention, the foregoing object is also attained by providing a method of controlling an image sensing apparatus for performing focus control based upon image data of a region corresponding to a focus control region, the image data being a part of one screen of image data of one picture screen, the method comprising:

a camera-shake detection step of detecting camera shake; and a focus control region shifting step of changing the focus control region with respect to the screen based upon result of detection performed at the camera-shake detection step.

Further features of the present invention will become apparent from the following description of exemplary embodiments (with reference to the attached drawings).

BRIEF DESCRIPTION OF THE DRAWINGS

FIGS. 3A and 3B are graphs illustrating the relationship between focusing-lens position and evaluation values at respective ones of these positions in the first embodiment of the present invention;

FIG. 4 is a block diagram illustrating the functional configuration of an image sensing apparatus according to a second embodiment of the present invention;

FIGS. 6A and 6B are graphs illustrating the relationship between focusing-lens position and evaluation values at respective ones of these positions in the prior art.

DESCRIPTION OF THE EMBODIMENTS

Preferred embodiments of the present invention will be described in detail in accordance with the accompanying drawings.

Figure 1:
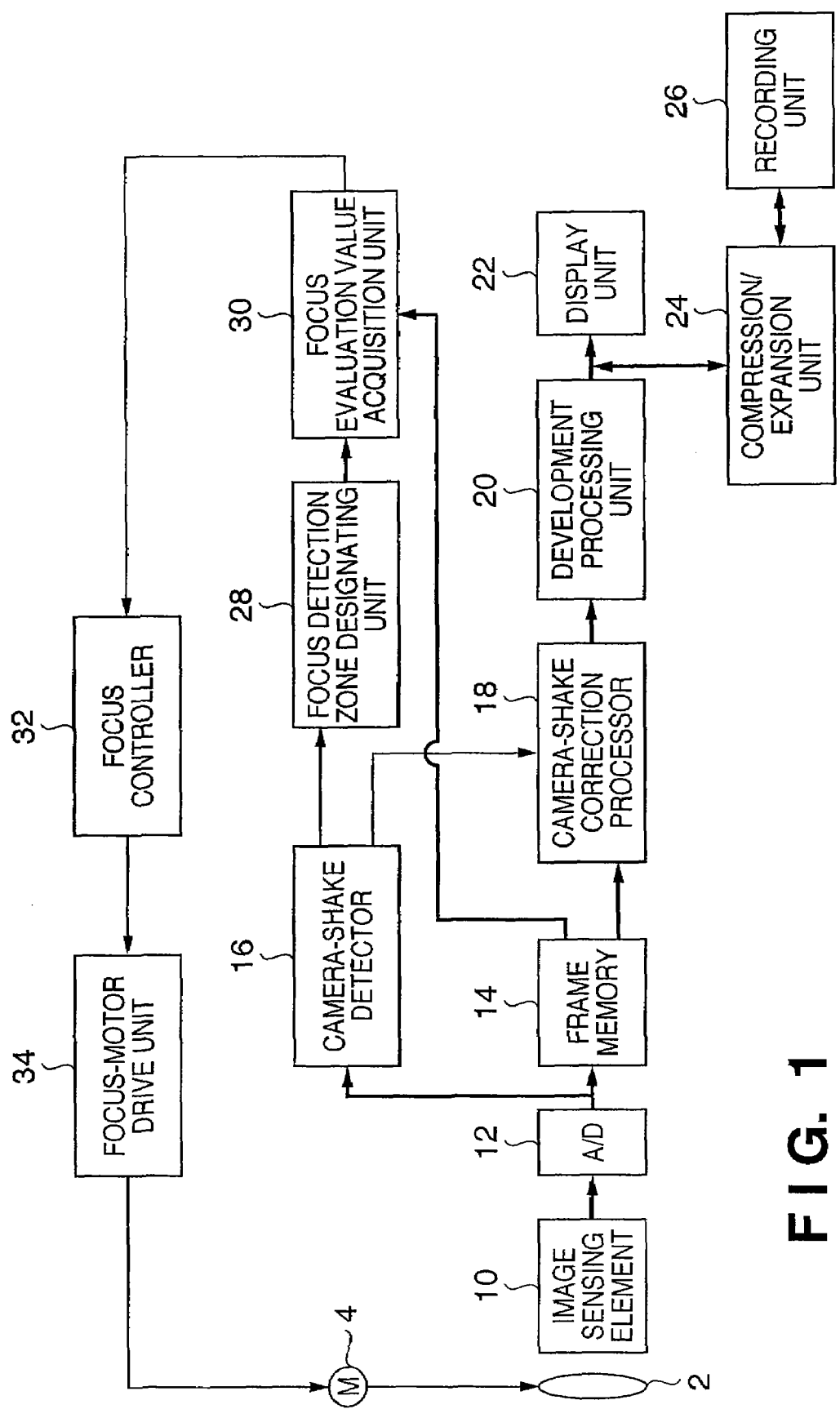
FIG. 1 is a block diagram illustrating the functional configuration of an image sensing apparatus according to a first embodiment of the present invention.

The image sensing apparatus illustrated in FIG. 1 includes a focusing lens 2. Although a single lens is illustrated for the sake of convenience, the focusing lens may comprise a single lens or a plurality of lenses. A focus motor 4 drives the focusing lens 2. An image sensing element 10, which is a CCD sensor or CMOS sensor, converts the optical image of a subject to an electrical image signal and outputs the image signal. An A/D converter 12 is for converting the analog image signal, which is output from the image sensing element 10, to a digital image signal. A frame memory 14, which comprises a DRAM or the like, has a buffer function for temporarily storing the digital image signal from the A/D converter 12. Usually data is written to and read from the DRAM via a memory controller.

A camera-shake detector 16 generates a simple luminance signal from the digital image signal that is output from the A/D converter 12 and outputs a camera-shake correction signal, which is for correcting camera shake using this luminance signal, to a focus detection zone designating unit 28 (described later) and camera-shake correction processor 18. The camera-shake correction processor 18 uses the camera-shake correction signal from the camera-shake detector 16 to apply camera-shake correction processing to image data that has been stored temporarily in the frame memory 14.

A development processing unit 20 is for developing image data, which has been corrected for camera shake by the camera-shake correction processor 18, in YUV format. The development processing unit 20 generates YUV data, which is a preliminary stage for generating JPEG data, the latter being the common recording format in a digital camera, by way of example. A display unit 22 displays a screen of video on a CRT or color LCD, etc., in the form of a live image, and presents a review display after a picture is taken. A compression/expansion unit 24 compresses the YUV data, which is received from the development processing unit 20, in the JPEG format, etc., and conversely expands compressed data read via a recording unit 26. The recording unit 26 writes image data, which has undergone JPEG compression by the compression/expansion unit 24, to recording media such as CF or SD card, and reads image data that has been recorded on the recording media.

The focus detection zone designating unit 28 designates a focus detection zone in which a subject to be imaged is brought into focus. The focus detection zone designating unit 28 designates the focus detection zone based upon camera-shake information from the camera-shake detector 16. A focus evaluation value acquisition unit 30 acquires an evaluation value for judging the in-focus state based upon image data that corresponds to the focus detection zone designated by the focus detection zone designating unit 28. A focus controller 32 receives the evaluation value from the focus evaluation value acquisition unit 30, judges the in-focus position and instructs the focus motor 4 to move to the in-focus position. A focus-motor drive unit 34 drives and controls the focus motor 4 in accordance with a command from the focus controller 32.

Processing executed by the camera-shake detector 16 in the first embodiment will be described next.

The camera-shake detector 16 accepts digital image data from the A/D converter 12 and generates a simple luminance signal by applying a low-pass filter to this digital image data. With regard to this luminance signal, the camera-shake detector 16 detects the motion vector of an image on a per-area (macroblock) basis using, e.g., a block matching method, the areas being obtained by dividing one screen into a plurality of areas. The camera-shake detector 16 generates camera-shake correction data upon detecting a camera-shake vector of a background image, which is ascribable to camera shake, from the motion vector of each macroblock. The method of detecting the camera-shake vector includes first detecting the motion vector of the entire image and a partial motion vector. The motion vector that results from excluding the partial motion vector from the motion vector of the overall image is adopted as the camera-shake vector representing fluctuation of the screen due to camera shake. On the basis of this vector, the camera-shake detector 16 acquires camera-shake information of less than one pixel with respect to a reference image and generates two types of correction data, namely first camera-shake correction data used by the focus detection zone designating unit 28 and second camera-shake correction data for use by the camera-shake correction processor 18.

The first camera-shake correction data used by the focus detection zone designating unit 28 is correction data for moving the focus detection zone relative to the screen in a direction in which a camera-shake correction is performed so as to cancel out camera shake. On the other hand, the second camera-shake correction data used by the camera-shake correction processor 18 moves the screen to display the corrected image on the display unit 22 or record the corrected image using the recording unit 26.

Camera shake in a case where a picture is taken while the camera is held in the hand of a person includes a mixture of short-cycle camera shake and long-cycle camera shake. If such camera shake is corrected as is, a variety of problems arise in the video seen by the photographer. For example, assume that the camera is panned. If camera shake is corrected as is in such case, the image is shifted up to the camera-shake correction limit in such a manner that the position of the image will not move. If the camera-shake correction is no longer capable of being performed at the limit of the camera-shake correction, the image changes over suddenly. Such a sudden changeover in the image results in a video display that gives a very odd impression and greatly detracts from the quality of the moving image. Accordingly, image data for display or recording is not subjected to a camera-shake correction as is. Rather, a natural camera-shake correction is carried out while correcting for high-frequency fine camera shake and correcting for slight camera shake such as low-frequency motion of the image as at the time of panning.

On the other hand, the camera-shake correction performed by the focus detection zone designating unit 28 described earlier has no direct relation to the quality of the moving image "seen by the photographer" mentioned above. That is, it is preferred that fluctuation of the screen be suppressed or, in other words, that the focus detection zone be placed in a state in which it is fixed with respect to the subject. In this sense, it is better to carry out a complete camera-shake correction.

Figure 2B:
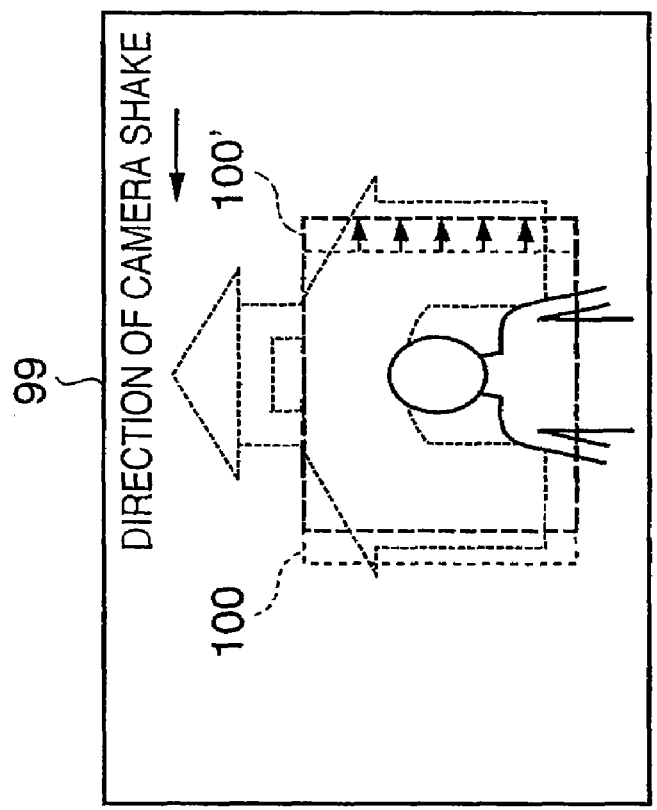
FIGS. 2A and 2B are diagrams illustrating the positional relationship between a subject and background and a focus detection zone in the absence and presence, respectively, of camera shake.
Figure 2A:
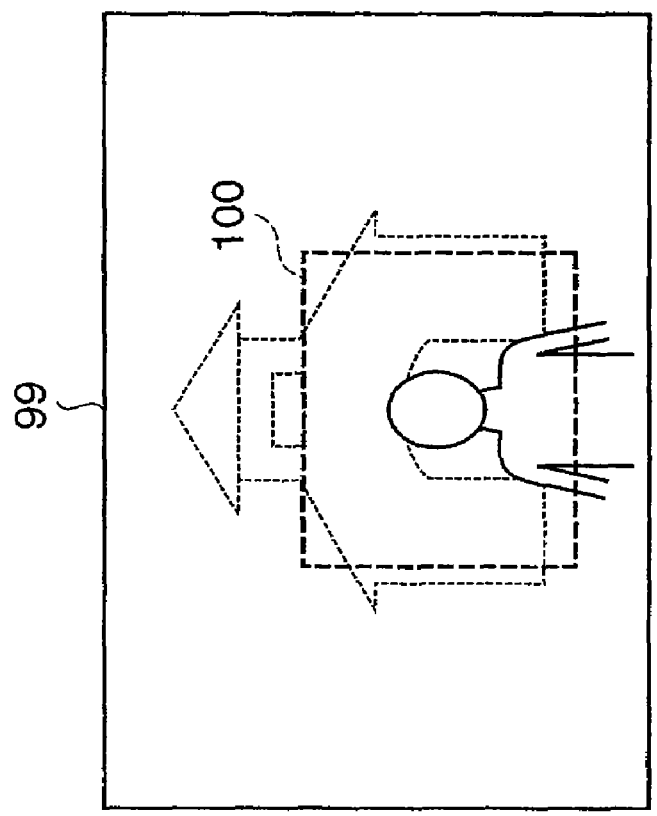
Figure 5B:
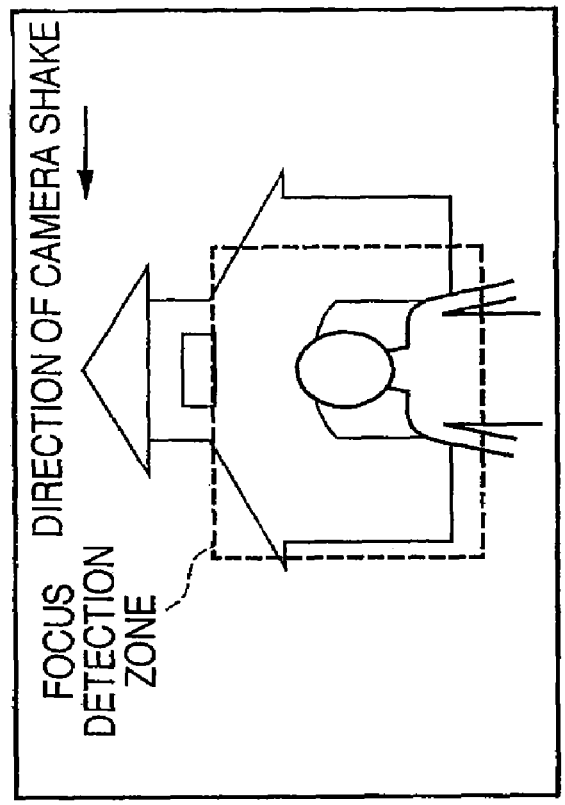
FIGS. 5A and 5B are diagrams illustrating the positional relationship between a subject and background and a focus detection zone in the absence and presence, respectively, of camera shake according to the prior art.
Figure 5A:
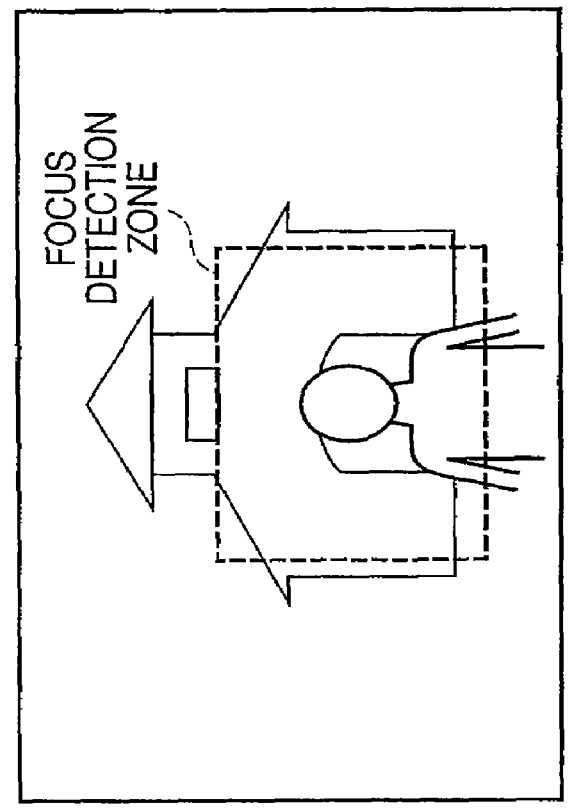

FIG. 2A illustrates the positional relationship between a subject and background in the absence of camera shake, as well as the positional relationship between a screen 99 and a focus detection zone 100. FIG. 2B illustrates the positional relationship in a case where the focus detection zone has been moved in a direction that corrects for camera shake when such camera shake has occurred, as well as the positional relationship between the screen 99 and focus detection zones 100, 100'. In the example illustrated in FIG. 2A, the focus detection zone 100 is situated inside a building surrounding a person. On the other hand, in the case where camera shake has occurred, FIG. 2B illustrates the manner in which the focus detection zone 100 is moved on the screen 99 from the position shown in FIG. 2A to the position 100' in the direction opposite the direction of camera shake. By moving the focus detection zone on the screen 99 in the direction opposite that of camera shake, as illustrated in FIG. 2B, a relative deviation can be suppressed in the relationship between the subject and the focus detection zone. Accordingly, the focus detection zone will not emerge from the inside of the building and will not come to include the outside wall on the right side. Thus, based upon the first camera-shake correction data obtained by the camera-shake detector 16, the focus detection zone designating unit 28 moves the focus detection zone so as to cancel out camera shake. The camera-shake correction of the focus detection zone based upon the first camera-shake correction data cancels out camera shake more strongly than the camera-shake correction of the screen based upon the second camera-shake correction data. Further, the camera-shake correction of the focus detection zone based upon the first camera-shake correction data corrects actual camera shake more sensitively than the camera-shake correction of the screen based upon the second camera-shake correction data.

FIGS. 3A and 3B are graphs illustrating the relationship between focusing-lens position and evaluation value when a plurality of images are sensed and evaluation values acquired while the position of the focusing lens is moved with regard to the subject shown in FIGS. 2A and 2B. FIG. 3A is a graph obtained when there is no camera shake. In this case, the evaluation values peak when the subject is in focus. Further, FIG. 3B is a graph illustrating a situation in which camera shake occurs when the focusing lens is at a position where the background building is in focus but there is substantially no change in the relationship between the subject and the focus detection zone owing to the camera-shake correction.

In accordance with the first embodiment of the invention as set forth above, camera-shake correction data is generated for display and for recording. This data corrects a limited amount of fluctuation of the screen, namely high-frequency shake. Further, in order to correct the position of the focus detection zone, camera-shake correction data having a higher degree of correlation and a high trackability with respect to actual camera shake is generated. An image for display and recording is subjected to a camera-shake correction that does not give an odd impression to the observer, such as the photographer. With regard to the focus detection zone, a camera-shake correction having a higher degree of correlation is applied to actual camera shake. As a result, it is possible to improve the accuracy of focus control while the quality of display and recording is maintained.

Second Embodiment

A second embodiment of the present invention will be described next. In the first embodiment, detection and correction of camera shake are performed by applying image processing to image data obtained by image sensing. By contrast, in the second embodiment, camera shake is detected using a gyro sensor and the detected camera shake is cancelled out using an optical member.

FIG. 4 is a block diagram illustrating the functional configuration of an image sensing apparatus according to a second embodiment of the present invention. Components in FIG. 4 similar to those shown in FIG. 1 are designated by like reference characters and need not be described again.

As shown in FIG. 4, the apparatus includes an optical member 6 such as a shift lens for canceling out camera shake by shifting the optical path of the optical image of a subject. It should be noted that various means such as means for shifting an image sensing element are known in addition to the optical member used in camera-shake correction, and any of these means may be employed. The apparatus further includes a second motor 8 for driving the optical member 6.

The apparatus further includes a camera-shake detector 36 for detecting camera shake. The camera-shake detector 36 generally uses a gravity acceleration sensor such as a gyro sensor. However, the detector is not limited to a gyro sensor and may be other camera-shake detecting means. The camera-shake information obtained by detection in the image sensing apparatus is output to the optical member 6 and focus detection zone designating unit 28.

The camera-shake correction operation according to the second embodiment will now be described.

Using in general a gravity acceleration sensor such as a gyro sensor, the camera-shake detector 36 detects the direction of camera movement as caused by camera shake. The camera-shake detector 36 generates first and second camera-shake correction data in a direction that cancels out detected camera shake and outputs the first and second camera-shake correction data to the focus detection zone designating unit 28 and second motor 8, which is for driving the optical member 6, respectively. On the basis of the second camera-shake correction data from the camera-shake detector 36, the second motor 8 that drives the optical member 6 drives the optical member 6, such as a shift lens, and corrects the camera shake of the video of the subject.

In the second embodiment, the second camera-shake correction is camera-shake correction data that performs a natural camera-shake correction in a manner similar to that of the second camera-shake correction data described in the first embodiment. On the other hand, the first camera-shake correction data in the second embodiment is data that corrects the amount of camera shake by moving the focus detection zone, this being performed with respect to the image obtained following execution of the camera-shake correction by the optical member 6 based upon the second camera-shake correction data. The camera-shake correction performed by the optical member 6 using the second camera-shake correction data is a camera-shake correction that corrects a limited amount of fluctuation of the screen, namely high-frequency shake, for the purpose of display and recording. Further, this is a camera-shake correction which, in order to correct the position of the focus detection zone, subjects actual camera shake to correction of shake not corrected by the camera-shake correction performed by the optical member 6. As a result, the focus detection zone is subjected to a camera-shake correction having higher trackability and a higher degree of correlation for the purpose of display and recording.

In accordance with the second embodiment, as set forth above, effects similar to those of the first embodiment can be obtained even by exercising control so as to cancel out camera shake by driving an optical member such as a shift lens using a camera-shake detector, such as a gyro sensor, which does not rely upon image processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-159141, filed Jun. 7, 2006, which is hereby incorporated by reference herein in its entirety.

What is claimed is:

1. An image sensing apparatus for performing focus control based upon image data of a region corresponding to a focus control region, the image data being a part of one screen of image data, said apparatus comprising:

a camera-shake detector that detects camera shake and generates first camera-shake correction data and second camera-shake correction data that is different from the first camera-shake correction data; and a focus control region shifter that changes the focus control region with respect to the screen based upon the first camera-shake correction data; and a camera-shake correction unit that corrects camera shake of image data, which has been obtained by image sensing, based upon the second camera-shake correction data, wherein the correction based upon the first camera-shake correction data has a higher degree of correlation with respect to camera shake of the image sensing apparatus than the correction based upon the second camera-shake correction data.

2. The apparatus according to claim 1, wherein the first camera-shake correction data is data that cancels out detected camera shake, and the second camera-shake correction data is data that corrects camera shake of high-frequency components.

3. The apparatus according to claim 1, wherein said camera-shake detector detects camera shake by applying image processing to image data obtained by image sensing.

4. An image sensing apparatus for performing focus control based upon image data of a region corresponding to a focus control region, the image data being a part of one screen of image data, said apparatus comprising:

a camera-shake detector that detects camera shake and generates first camera-shake correction data and second camera-shake correction data that is different from the first camera-shake correction data;

a focus control region shifter that changes the focus control region with respect to the screen based upon the first camera-shake correction data; and a camera-shake correction unit that corrects camera shake by shifting light, which is incident upon an image sensing device, with respect to light from a subject based upon the second camera-shake correction data, wherein the change of the focus control region has a higher degree of correlation with respect to camera shake of the image sensing apparatus than the shift of the incident light.

5. The apparatus according to claim 4, wherein the second camera-shake correction data is data that corrects camera shake of high-frequency components, and the first camera-shake correction data is data that is the result of subtracting the second camera-shake correction from data that cancels out detected camera shake.

6. The apparatus according to claim 4, wherein said camera-shake detector detects camera shake by a gyro sensor.

7. A method of controlling an image sensing apparatus for performing focus control based upon image data of a region corresponding to a focus control region, the image data being a part of one screen of image data, said method comprising:

a camera-shake detection step of detecting camera shake and generating first camera-shake correction data and second camera-shake correction data that is different from the first camera-shake correction data; and a focus control region shifting step of changing the focus control region with respect to the screen based upon the first camera-shake correction data; and a camera-shake correction step of correcting camera shake of image data, which has been obtained by image sensing, based upon the second camera-shake correction data, wherein the correction based upon the first camera-shake correction data has a higher degree of correlation with respect to camera shake of the image sensing apparatus than the correction based upon the second camera-shake correction data.

8. A method of controlling an image sensing apparatus for performing focus control based upon image data of a region corresponding to a focus control region, the image data being a part of one screen of image data, said method comprising:

a camera-shake detection step of detecting camera shake and generating first camera-shake correction data and second camera-shake correction data that is different from the first camera-shake correction data;

a focus control region shifting step of changing the focus control region with respect to the screen based upon the first camera-shake correction data; and a camera-shake correction step of correcting camera shake by shifting light, which is incident upon an image sensing device, with respect to light from a subject based upon the second camera-shake correction data, wherein the change of the focus control region has a higher degree of correlation with respect to camera shake of the image sensing apparatus than the shift of the incident light.

* * * * *